United States Patent
Anezaki

(10) Patent No.: US 10,367,959 B2
(45) Date of Patent: Jul. 30, 2019

(54) POST PROCESSING APPARATUS

(71) Applicant: Konica Minolta, Inc., Chiyoda-ku, Tokyo (JP)

(72) Inventor: Tsutomu Anezaki, Hachioji (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 15/666,411

(22) Filed: Aug. 1, 2017

(65) Prior Publication Data

US 2018/0063348 A1 Mar. 1, 2018

(30) Foreign Application Priority Data

Sep. 1, 2016 (JP) .................. 2016-170450

(51) Int. Cl.
*H04N 1/00* (2006.01)
*G03G 15/00* (2006.01)

(52) U.S. Cl.
CPC ..... *H04N 1/00748* (2013.01); *G03G 15/5062* (2013.01); *G03G 15/6582* (2013.01); *H04N 1/00602* (2013.01); *H04N 1/00639* (2013.01); *H04N 1/00702* (2013.01); *H04N 1/00795* (2013.01); *B65H 2801/27* (2013.01); *G03G 2215/00814* (2013.01); *G03G 2215/00818* (2013.01); *G03G 2215/00831* (2013.01); *G03G 2215/00877* (2013.01)

(58) Field of Classification Search
CPC .................................. H04N 1/00748
USPC ...................................... 358/1.12
See application file for complete search history.

(56) References Cited

U.S. PATENT DOCUMENTS

| | | | |
|---|---|---|---|
| 2011/0084436 A1* | 4/2011 | Shirakuma ................ | B42C 1/10 270/37 |
| 2012/0152077 A1* | 6/2012 | Kato ....................... | B65H 7/10 83/368 |
| 2013/0193629 A1* | 8/2013 | Kato ....................... | B65H 39/00 270/37 |
| 2014/0284863 A1* | 9/2014 | Matsumoto ............... | B42C 1/12 270/1.01 |
| 2015/0262045 A1* | 9/2015 | Arai ..................... | G06K 15/1876 358/1.2 |
| 2016/0116882 A1* | 4/2016 | Ikuno ..................... | B42C 99/00 399/410 |

FOREIGN PATENT DOCUMENTS

JP  2007-153592 A  6/2007

OTHER PUBLICATIONS

Extended European Search Report dated Jan. 4, 2018, in European Patent Application No. 17184165.3, 8 pages.
First Office Action dated Jan. 28, 2019, in Chinese Patent Application No. 201710761457.8, 18 pages.

* cited by examiner

*Primary Examiner* — Jacky X Zheng
(74) *Attorney, Agent, or Firm* — Squire Patton Boggs (US) LLP

(57) ABSTRACT

A post processing apparatus includes: a reader that reads paper on which an image is formed by an image forming apparatus to acquire a read image; a post processor that performs post processing on the paper; and a hardware processor that detects a position of an edge of the paper and a position of the image from the read image acquired by the reader, and controls a post processing position in the post processor on the basis of the position of the edge of the paper and the position of the image detected.

11 Claims, 16 Drawing Sheets

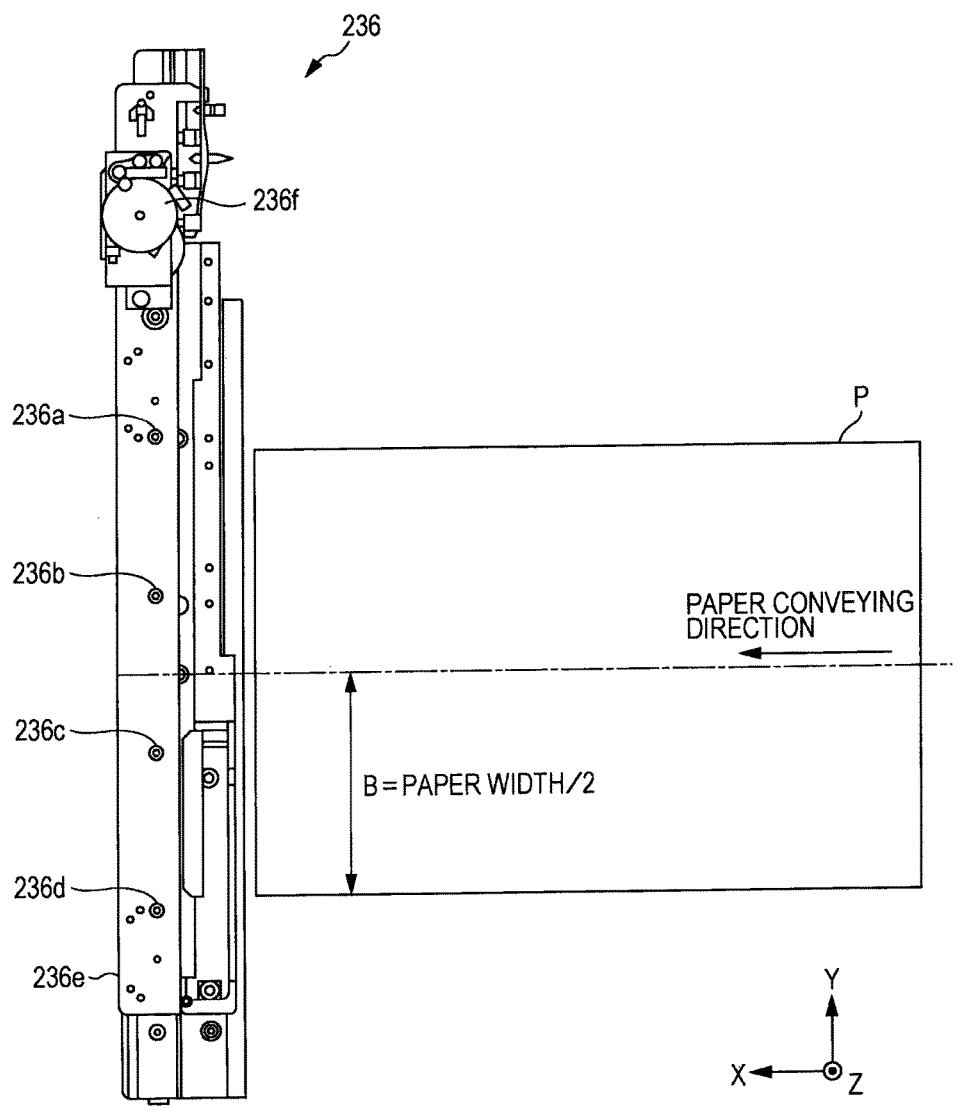

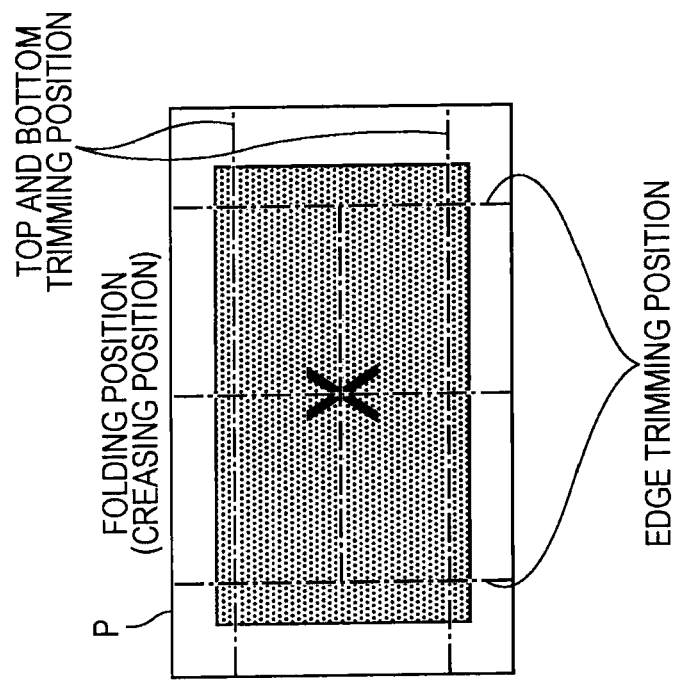
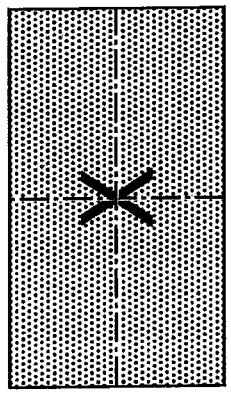
FIG. 15A
FIG. 15B

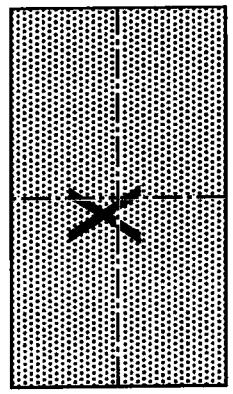
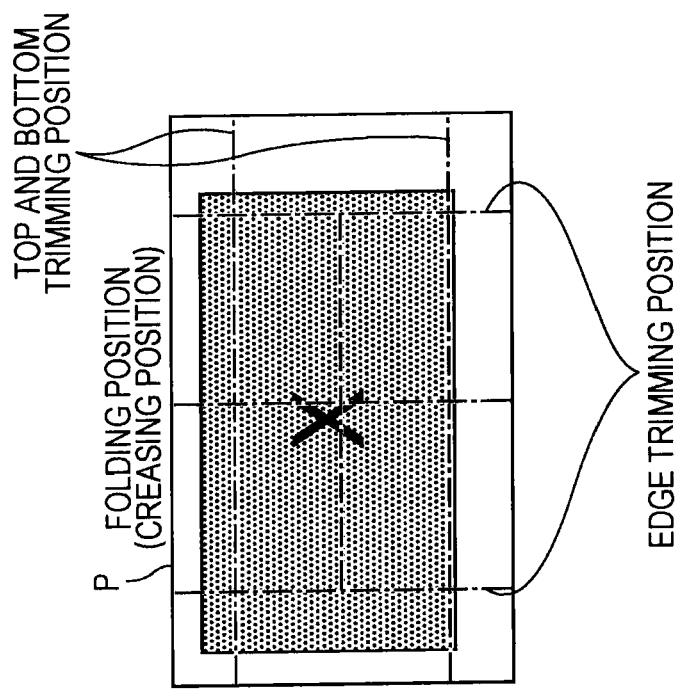
FIG. 19B
FIG. 19A

POST PROCESSING APPARATUS

Japanese Patent Application No. 2016-170450 filed on Sep. 1, 2016, including description, claims, drawings, and abstract the entire disclosure is incorporated herein by reference in its entirety.

BACKGROUND

Technological Field

The present invention relates to a post processing apparatus.

Description of the Related Art

In related art, a post processing apparatus has been known that performs post processing such as creasing, top and bottom trimming, half-folding, saddle stitching, or edge trimming to paper on which an image is formed, to create a booklet. In such a post processing apparatus, for example, to create a full bleed booklet, a quality is required not only to make a finished dimension of the booklet itself a predetermined dimension, but also to evenly trim with respect to a printed image position.

Post processing positions such as a creasing position, a half-folding position, a saddle stitching position, and a top and bottom trimming position are generally defined on the basis of an edge of paper (on a paper basis). However, on the paper basis, it is not possible to absorb a deviation between the paper and the image caused by an image forming apparatus, dimensional variation originally included in the paper, and a small deviation between the paper and the image due to contraction of the paper caused by heat fixing, and, as illustrated in FIGS. 19A and 19B, the center of a printed image area may deviate from the center of the booklet. For that reason, it is required to finely adjust a positional relationship between a printed image and a post processing position by visual confirmation of output paper by a user, and it has taken time and labor costs. In addition, waste of toner and paper for sample output for adjustment has occurred.

Therefore, for example, JP 2007-153592 A describes that, when an image based on image data is formed on recording paper, a mark is formed at a predetermined position with respect to the image, and a punch position is adjusted by a punch unit being a post processing apparatus on the basis of the mark.

However, in the technique described in JP 2007-153592 A, since the mark different from the image based on the image data is formed on the paper, an unnecessary mark not desired by the user may remain as an image.

SUMMARY

An object of the present invention is to make it possible to control a post processing position without printing the unnecessary mark.

To achieve the abovementioned object, according to an aspect of the present invention, a post processing apparatus reflecting one aspect of the present invention comprises:

a reader that reads paper on which an image is formed by an image forming apparatus to acquire a read image;

a post processor that performs post processing on the paper; and a hardware processor that detects a position of an edge of the paper and a position of the image from the read image acquired by the reader, and controls a post processing position in the post processor on the basis of the position of the edge of the paper and the position of the image detected.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention:

FIG. 8 is a top view illustrating a basic configuration of a punching unit of FIG. 2;

FIGS. 15A and 15B are diagrams schematically illustrating paper before trimming and a finished spread booklet in a case where the post processing position control processing A is applied;

FIGS. 19A and 19B are diagrams schematically illustrating paper before trimming and a finished spread booklet according to a related art.

DETAILED DESCRIPTION OF EMBODIMENTS

Hereinafter, one or more embodiments of the present invention will be described in detail with reference to the drawings. However, the scope of the invention is not limited to the disclosed embodiments. In the following description, a horizontal direction of an image forming system illustrated in FIG. 1 is an X direction, a vertical direction is a Z direction, and a direction orthogonal to the X direction and the Z direction is a Y direction.

First Embodiment

Figure 1:
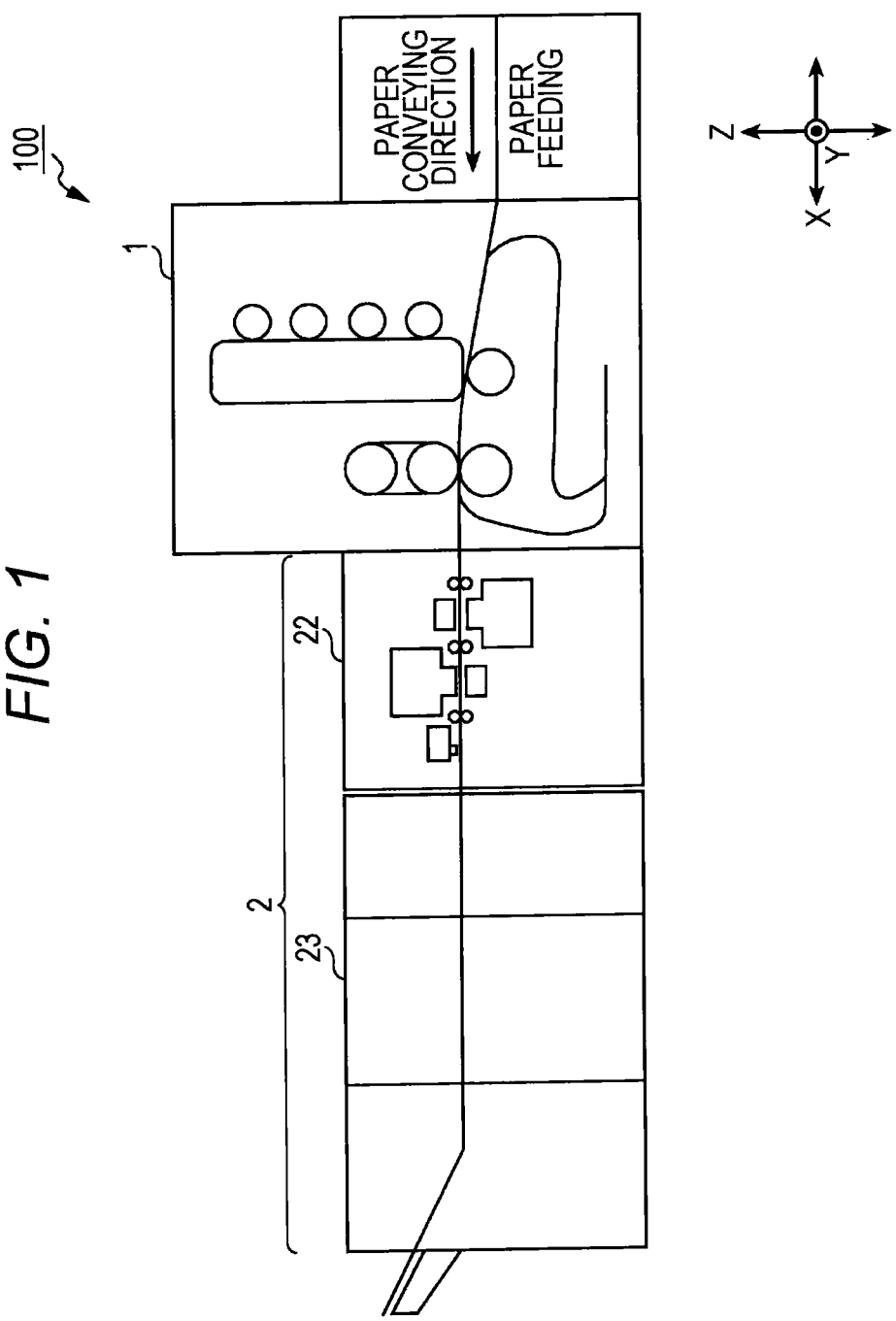
FIG. 1 is a diagram illustrating an overall configuration example of an image forming system.

FIG. 1 illustrates an overall configuration example of an image forming system 100 in a first embodiment of the present invention. As illustrated in FIG. 1, the image forming system 100 is configured to include an image forming apparatus 1 and a post processing apparatus 2. The image forming apparatus 1 is provided in a paper conveying direction upstream side of the post processing apparatus 2.

The image forming apparatus 1 forms (prints) and fixes an image on paper P on the basis of input job data, and conveys the paper P to the post processing apparatus 2. The job data includes image data of the image to be formed on the paper P and various types of setting information (for example, a paper size, an amount of margin, a printable area size, presence of double-sided printing, a type of post processing to be executed, the number of pages, the number of copies). In addition, the image forming apparatus 1 transmits the job data to the post processing apparatus 2. Incidentally, in the present embodiment, description is made assuming that the image forming apparatus 1 performs conveying to the post processing apparatus 2 with the printed side facing down in a case where single-sided printing is performed.

The post processing apparatus 2 performs post processing to the paper on which the image is formed in the image forming apparatus 1.

Figure 2:
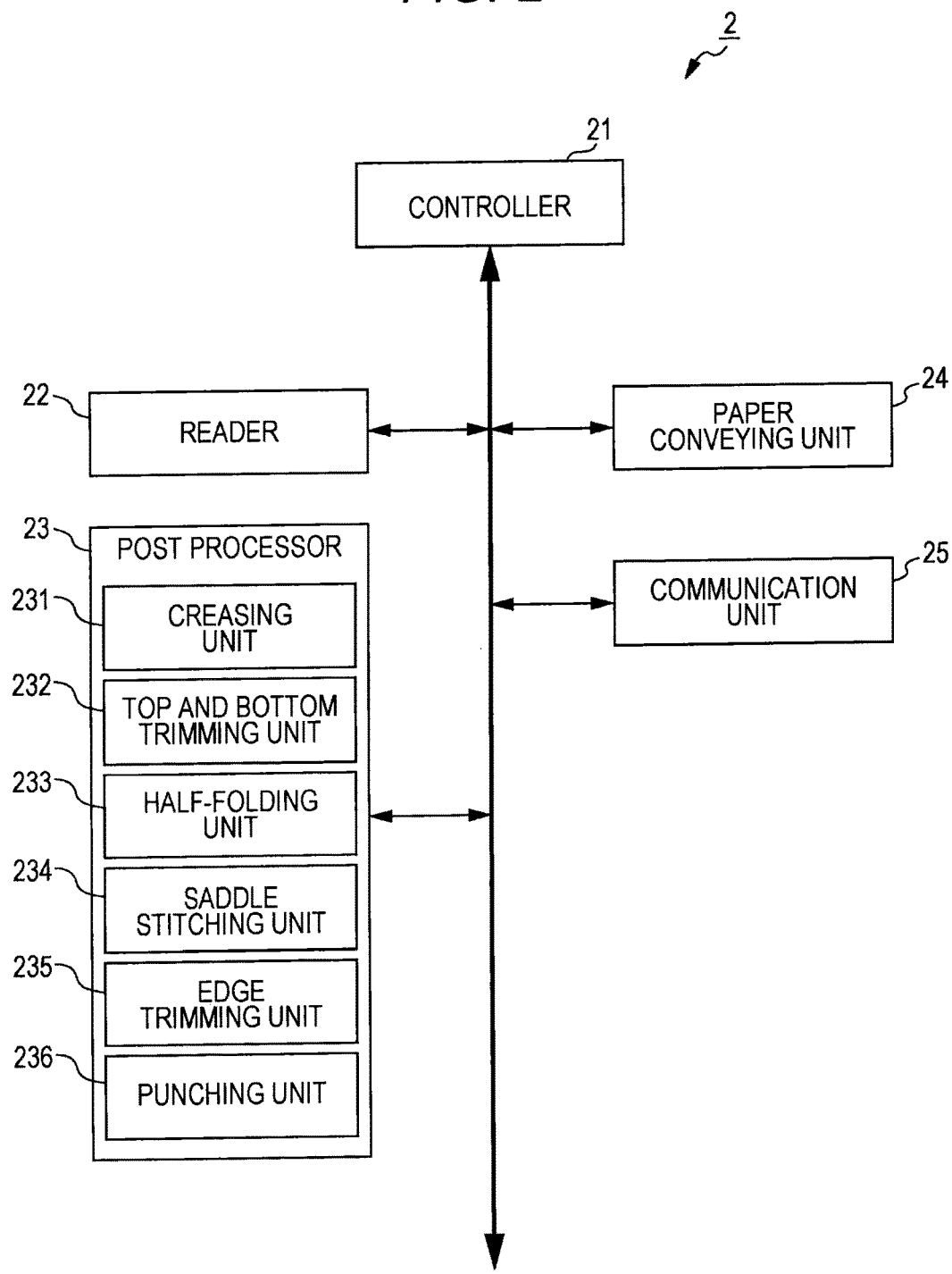
FIG. 2 is a block diagram illustrating a functional configuration of a post processing apparatus of FIG. 1.

FIG. 2 illustrates a functional block diagram of the post processing apparatus 2. As illustrated in FIG. 2, the post processing apparatus 2 is configured to include a controller 21, a reader 22, a post processor 23, a paper conveying unit 24, and a communication unit 25.

The controller 21 is configured by a central processing unit (CPU), random access memory (RAM), read only memory (ROM), and the like. The CPU of the controller 21 reads a system program and various processing programs stored in the ROM and deploys the programs on the RAM, and performs centralized control of operation of each unit of the post processing apparatus 2 in accordance with the programs deployed.

The reader 22 reads the paper (paper on which the image has been formed) conveyed from the image forming apparatus 1, and outputs a read image (referred to as scan data) to the controller 21.

Figure 3:
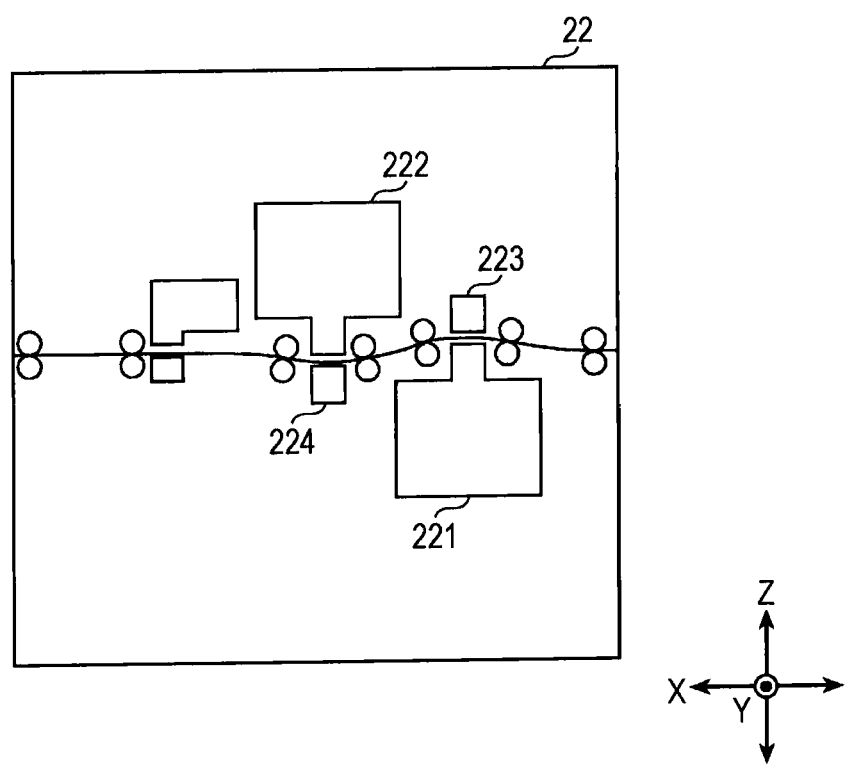
FIG. 3 is a diagram illustrating a schematic configuration of a reader of FIG. 2.

FIG. 3 illustrates a schematic configuration example of the reader 22. As illustrated in FIG. 3, the reader 22 includes a first scanner unit 221, and a second scanner unit 222.

The first scanner unit 221 includes a line sensor, an optical system, and a light source, and reads the bottom side of the paper P conveyed from the image forming apparatus 1. In a position facing the first scanner unit 221 across a paper conveying path, for example, a black background member 223 is provided. The first scanner unit 221 reads a range wider than the paper size, and the controller 21 grasps a paper edge from a color difference between the paper P and the background member 223 in the scan data.

The second scanner unit 222 has a configuration similar to the first scanner unit 221, and reads the top side of the paper P conveyed from the image forming apparatus 1. In a position facing the second scanner unit 222 across the paper conveying path, for example, a black background member 224 is provided.

Figure 4:
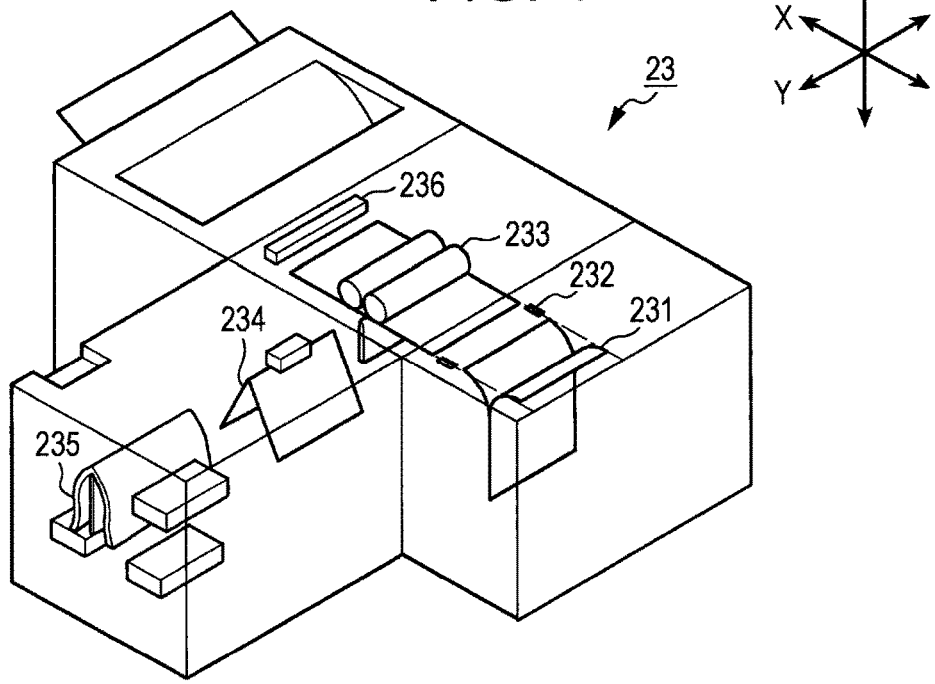
FIG. 4 is a perspective view illustrating a schematic configuration of a post processor of FIG. 2.

The post processor 23 is configured to include a creasing unit 231, a top and bottom trimming unit 232, a half-folding unit 233, a saddle stitching unit 234, an edge trimming unit 235, and a punching unit 236, as illustrated in FIGS. 2 and 4.

The creasing unit 231 performs creasing to the paper conveyed from the image forming apparatus 1.

Figure 5:
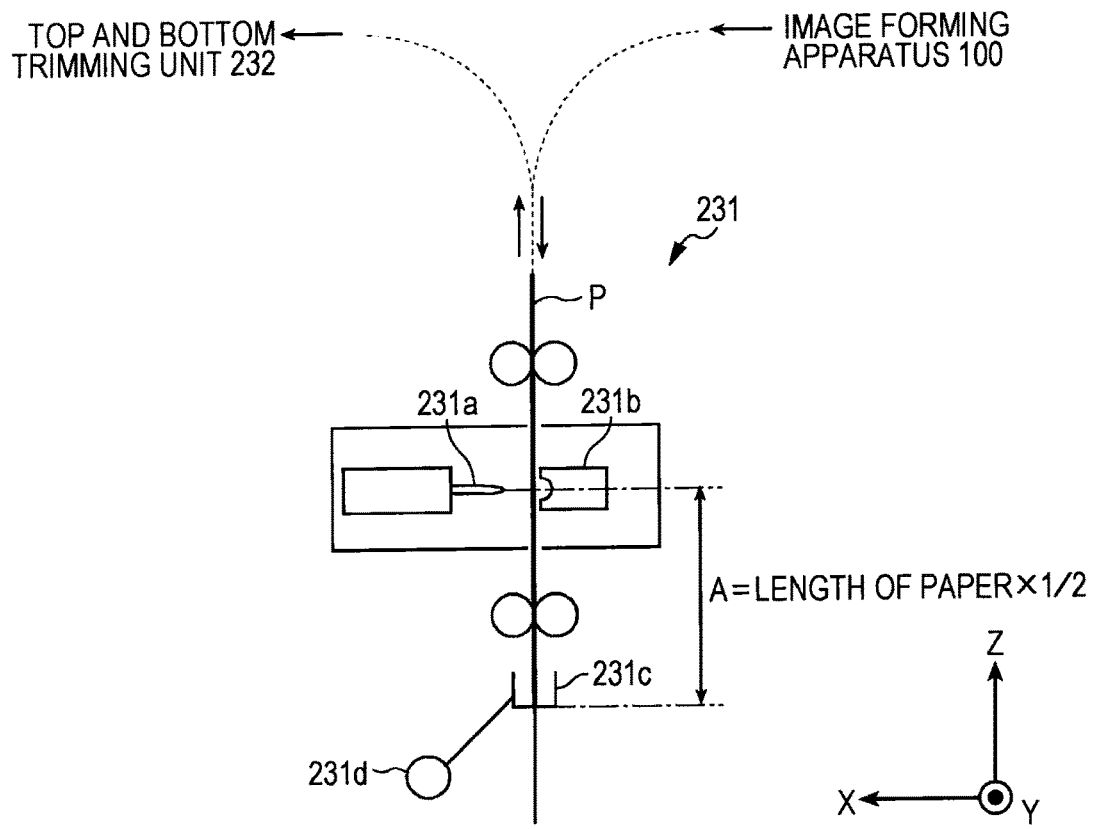
FIG. 5 is a cross-sectional view illustrating a basic configuration of a creasing unit of FIG. 2.

FIG. 5 is a cross-sectional view illustrating an example of a basic configuration of the creasing unit 231, in an XZ plane. As illustrated in FIG. 5, the paper P conveyed to the creasing unit 231 is drawn into an inversion path and conveyed downward, and stops in a state in which a paper tip is restricted to a predetermined position by a stopper 231c. In this state, a creasing knife 231a extending in the X direction extends in the minus X direction toward a creasing base 231b having a recess and similarly extending in the X direction, whereby the paper P is sandwiched between a tip of the creasing knife 231a and the recess of the creasing base 231b. With this operation, a crease with a longitudinal direction as the Y direction is formed on the paper P. Here, a position of the stopper 231c can be moved by a driving source 231d, and is positioned such that a distance between the stopper 231c and the creasing knife 231a is A=the length of the paper P in the conveying direction×½, in default. The paper P creased is conveyed to the top and bottom trimming unit 232.

The top and bottom trimming unit 232 trims a marginal portion of the paper P while conveying the paper P.

Figure 6:
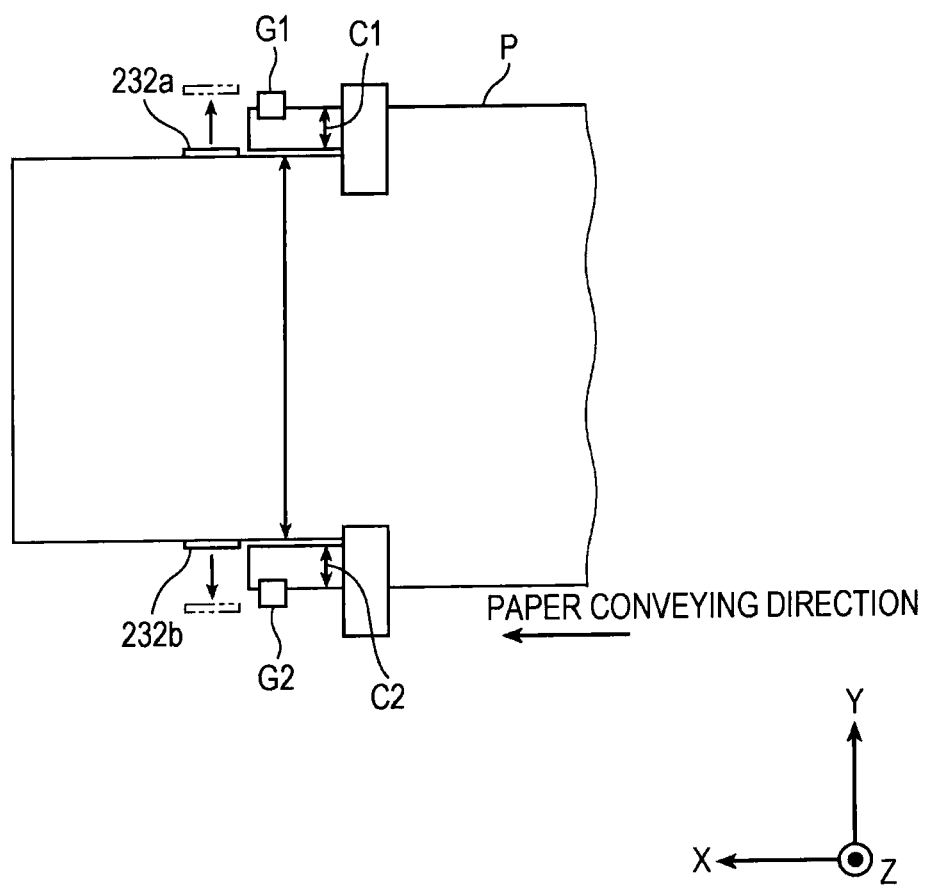
FIG. 6 is a top view illustrating a basic configuration of a top and bottom trimming unit of FIG. 2.

FIG. 6 is a top view illustrating an example of a basic configuration of the top and bottom trimming unit 232, in an XY plane. As illustrated in FIG. 6, the top and bottom trimming unit 232 has sensors G1, G2 for detecting the paper edges, and two trimming teeth 232a, 232b that can be moved in a paper width direction (the Y direction), and conveys the paper P in a state in which the trimming teeth 232a, 232b are respectively moved to the inside by cut amounts C1, C2 from the paper edges by a driving source not illustrated, thereby cutting the margins in the paper width direction of the paper P by the cut amounts C1, C2, respectively. Here, in default, the trimming teeth 232a, 232b are positioned such that the cut amounts C1, C2 each are a length×½, the length being obtained by subtracting a length in the Y direction of a printable area specified by the job data from a length in a direction orthogonal to the paper conveying direction of the paper P (paper width direction. Y direction).

The half-folding unit 233 performs half-folding (fold in two) to the paper P conveyed.

Figure 7A:
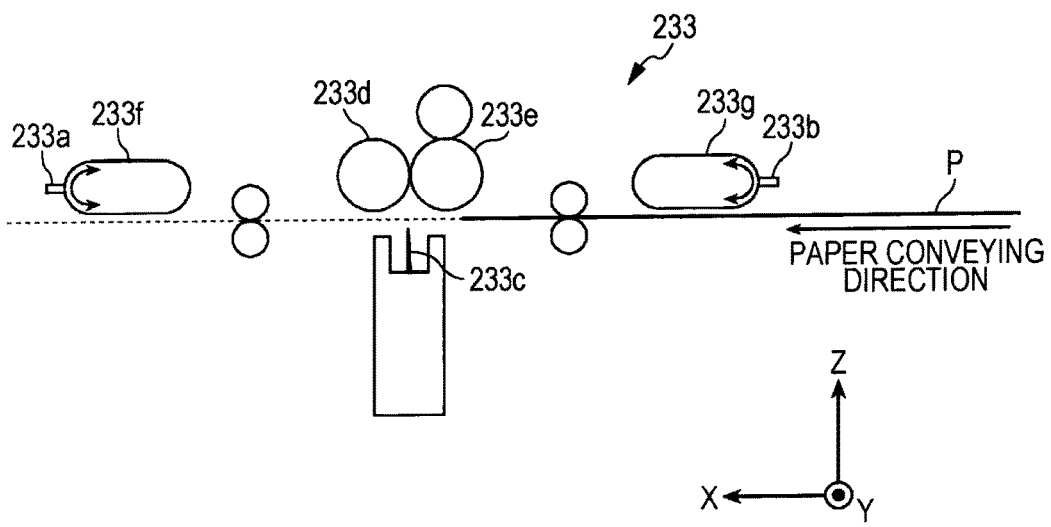
FIGS. 7A and 7B are cross-sectional views each illustrating a basic configuration of a half-folding unit of FIG. 2.
Figure 7B:
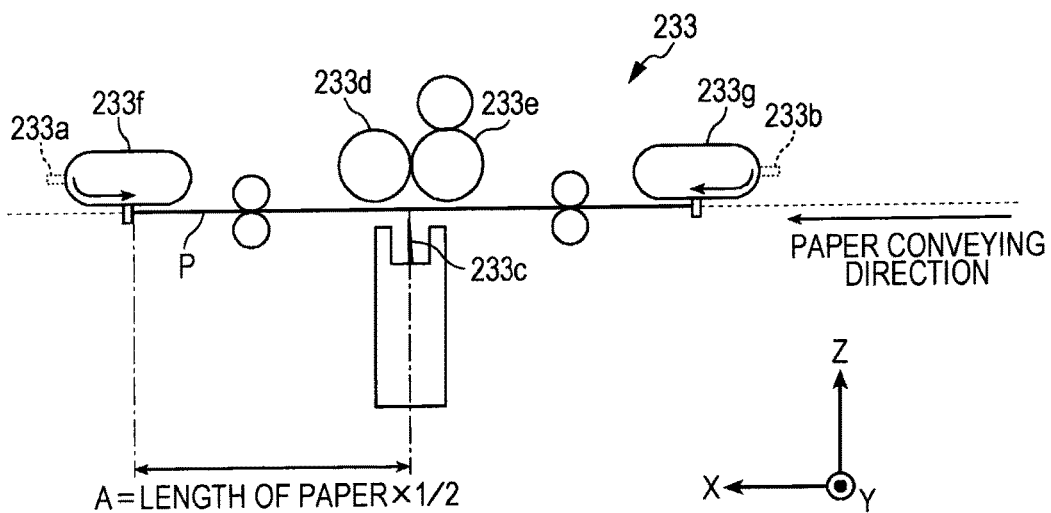

FIGS. 7A and 7B are cross-sectional views each illustrating a basic configuration of the half-folding unit 233, in an XZ plane. As illustrated in FIG. 7A, the half-folding unit 233 is configured to include a stopper 233a, an alignment member 233b, a folding knife 233c, and folding rollers 233d, 233e.

When the paper P is conveyed to the half-folding unit 233, the paper P stops in a state in which the paper tip is restricted to a predetermined position by the stopper 233a positioned at a predetermined position, as illustrated in FIG. 7B. After that, the paper P stops in a state in which a rear end of the paper P is restricted to a predetermined position by the alignment member 233b. In this state, the folding knife 233c extends toward the Z direction between the folding rollers 233d, 233e, whereby the paper is sandwiched between the folding rollers, and a fold is formed. Here, a position of the stopper 233a can be moved by a driving source 233f, and is positioned such that a distance between the stopper 233a and the folding knife 233c is A=the length of the paper P in the conveying direction×½, in default. The paper P half-folded is conveyed to the saddle stitching unit 234.

The saddle stitching unit 234 loads the paper P conveyed for one copy, and drives a binding needle in a folding position.

The edge trimming unit 235 trims an edge of a side perpendicular to a spine of a booklet saddle-stitched.

The punching unit 236 makes a punch hole in the paper P conveyed.

FIG. 8 is a top view illustrating an example of a basic configuration of the punching unit 236, in an XY plane. As illustrated in FIG. 8, the punching unit 236 is configured to include a punch unit 236e having a first piercing unit 236a to a fourth piercing unit 236d, a driving source 236f for moving the punch unit 236e in the Y direction (minus Y direction), and a sensor (not illustrated) for detecting the paper edge. When the paper P is conveyed, the punching unit 236 detects the paper edge, and moves the punch unit 236e to be at a predetermined position to the paper P by the driving source 236f, to perform punch processing. Here, a position of the punch unit 236e is positioned such that a distance between the mechanical center of the punch unit 236e (a midpoint between the second piercing unit 236b and the third piercing unit 236c in the present embodiment) and the paper edge is B=the length in the width direction of the paper P (paper width)×½, in default.

The paper conveying unit 24 includes a conveying roller, a conveying belt, and driving sources thereof, and conveys the paper P along the paper conveying path.

The communication unit 25 is configured by a modem, a LAN adapter, a router, and the like, and communicates with an external apparatus such as a personal computer (PC) connected to a communication network such as a local area network (LAN), or a wide area network (WAN). For example, the communication unit 25 receives the job data and the like from the external apparatus.

Next, operation of the post processing apparatus 2 is described.

Figure 9:
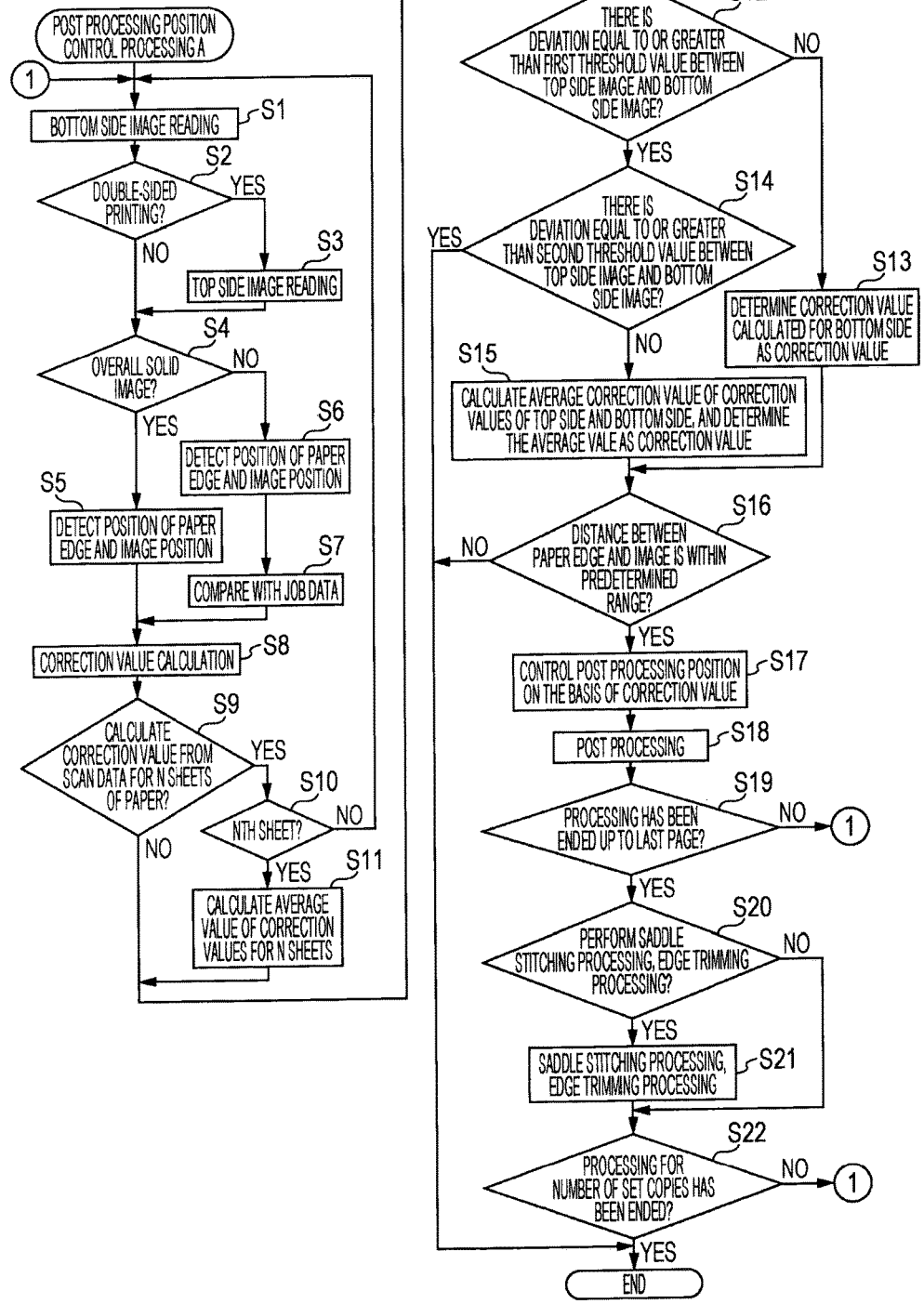
FIG. 9 is a flowchart illustrating post processing position control processing A executed by a controller of FIG. 2.

FIG. 9 illustrates a flowchart of post processing position control processing A executed by the controller 21. The post processing position control processing A is executed by cooperation between the CPU of the controller 21 and the programs stored in the ROM when the job data is received from the image forming apparatus 1 by the communication unit 25 and the paper P on which the image has been formed is conveyed.

First, the controller 21 causes the first scanner unit 221 to read the bottom side of the paper P to acquire the scan data (step S1).

Subsequently, the controller 21 refers to the job data, and determines whether or not the job is double-sided printing (step S2).

When it is determined that the job is not double-sided printing (step S2; NO), the controller 21 proceeds to step S4.

When it is determined that the job is double-sided printing (step S2; YES), the controller 21 causes the second scanner unit 222 to read the top side of the paper P to acquire the scan data (step S3), and proceeds to step S4.

In step S4, the controller 21 determines whether or not the image formed on the paper P is an overall solid image on the basis of the scan data acquired by steps S1, S3 (step S4). The overall solid image is an image formed in the entire surface of the printable area by the image forming apparatus 1.

When it is determined that the image is the overall solid image (step S4; YES), the controller 21 detects a position of a paper edge and a position of an image edge from the scan data read (step S5), and calculates correction values for controlling a post processing position on the basis of the position of the paper edge and the position of the image edge detected (step S8).

Figure 10:
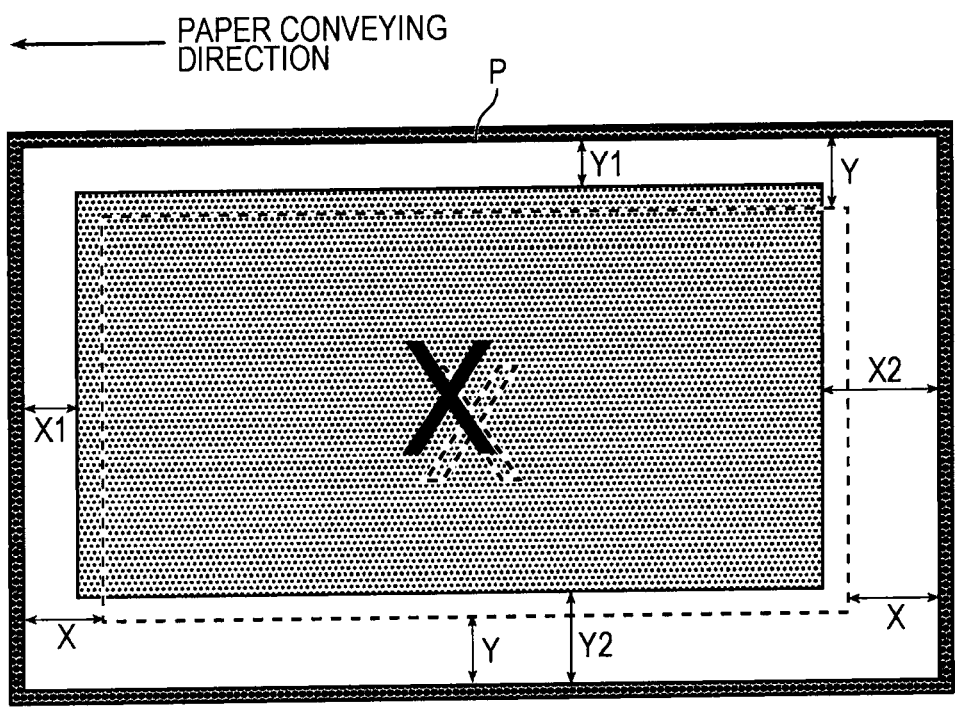
FIG. 10 is a diagram illustrating an example of scan data of when paper on which an overall solid image is printed is read.

FIG. 10 illustrates an example of the scan data of when the paper P on which the overall solid image is printed is read by the reader 22. In FIG. 10, a white rectangular area illustrates the paper P. A portion filled with dots in an area of the paper P illustrates a solid image area. A portion surrounded by a dotted line illustrates a printable area specified by the job data. In a case of the overall solid image, by detecting the position of the paper edge and the position of the image edge from the scan data, and on the basis of a distance between the paper edge and the image edge (X1, X2, Y1, Y2 of FIG. 10), it is possible to calculate correction values XH (a correction value in the paper conveying direction), YH (a correction value in the direction orthogonal to the paper conveying direction (paper width direction)) for controlling post processing position in each unit of the post processor 23, by the following equation.

$$XH=X1-(X1+X2)/2$$

$$YH=Y1-(Y1+Y2)/2$$

Incidentally, by using the job data, it is also possible to calculate the correction values XH, XY by the following equation.

$$XH=X1-X$$

$$YH=Y1-Y$$

When it is determined that the image is not the overall solid image (step S4; NO), the controller 21 detects the position of the paper edge and the position of the image from the scan data read (step S6), and compares a distance between the paper edge and the image detected (for example, a distance between the paper edge and the closest image) with a distance between the paper edge and the image in the job data (for example, a distance between the paper edge and the closest image) (step S7), and calculates the correction values for controlling the post processing position (step S8).

Figure 11:
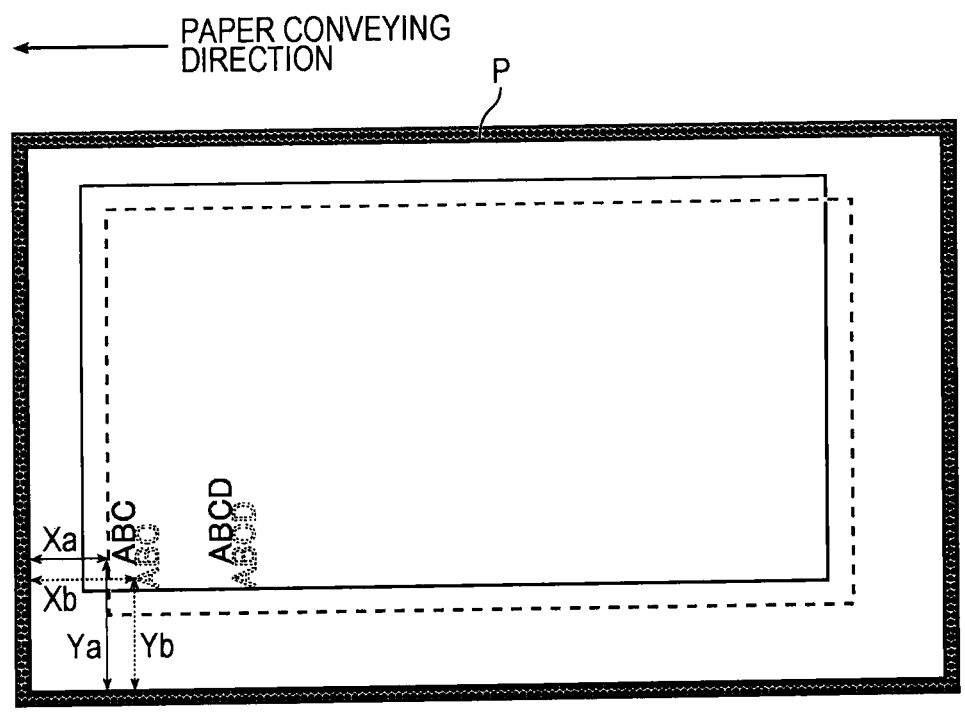
FIG. 11 is a diagram illustrating an example of scan data of when paper on which a character image is formed is read.

FIG. 11 illustrates an example of the scan data of when the paper P on which an image such as document data is formed is read by the reader 22, in which the position of the image edge cannot be detected from the scan data since the background portion of the image area is not printed. In FIG. 11, an area surrounded by a dotted line illustrates a printable area (image area) specified by the job data. A dotted line character illustrates an image (character image) of a character portion in the job data. An area surrounded by a solid line illustrates a printable area in the image forming apparatus 1 during image formation based on the job data. A solid line character illustrates a printed character image. In a case where the position of the image edge cannot be detected from the scan data, as illustrated in FIG. 11, by detecting the position of the paper edge and the position of the printed character image from the scan data, and on the basis of a distance between the paper edge and the printed character image (Xa, Ya of FIG. 11) and a distance between the paper edge and the position of the character image in the job data (Xb, Yb of FIG. 11), it is possible to calculate correction values XH1 (a correction value in the paper conveying direction), YH1 (a correction value in the direction orthogonal to the paper conveying direction) for controlling post processing position in each unit of the post processor 23, by the following equation.

$$XH1=Xa-Xb$$

$$YH1=Ya-Yb$$

Incidentally, the correction values are respectively calculated for the bottom side and the top side of the paper P.

Subsequently, the controller 21 determines whether or not to calculate the correction values from the scan data for N (N is an integer of 2 or more) sheets of paper (step S9). Whether or not to calculate the correction values from the scan data for N sheets of paper can be set from an operation unit or the like of the image forming apparatus 1 by a user in advance.

When it is determined not to calculate the correction values from the scan data for N sheets of paper (step S9; NO), the controller 21 proceeds to step S12.

When it is determined to calculate the correction values from the scan data for N sheets of paper (step S9; YES), the controller 21 determines whether or not the correction values of the scan data for the Nth sheet has been calculated (step S10). When it is determined that the correction values of the scan data for the Nth sheet has not been calculated (step S10; NO), the controller 21 returns to step S1. When it is determined that the correction values of the scan data for the Nth sheet has been calculated (step S10; YES), the controller 21 calculates average values of the correction values calculated from the scan data for N sheets of paper as correction values (step S11), and proceeds to step S12.

In step S12, the controller 21 determines whether or not there is a deviation equal to or greater than a first threshold value between an image position of the bottom side and an image position of the top side of the paper P (step S12). When it is determined that there is not the deviation equal to or greater than the first threshold value between the image position of the bottom side and the image position of the top side of the paper P (step S12; NO), the controller 21 determines the correction values calculated for the bottom side as correction values to be used for controlling the post processing position (step S13), and proceeds to step S16.

When it is determined that there is the deviation equal to or greater than the first threshold value between the image position of the bottom side and the image position of the top side of the paper P (step S12; YES), the controller 21 determines whether or not there is a deviation equal to or greater than a second threshold value (second threshold value>first threshold value) between the image position of the bottom side and the image position of the top side of the paper P (step S14).

When it is determined that there is not the deviation equal to or greater than the second threshold value between the image position of the bottom side and the image position of the top side of the paper P (step S14; NO), the controller 21 calculates average correction values of the correction values calculated for the bottom side and the correction values calculated for the top side (each of the correction value in the paper conveying direction and the correction value in the direction orthogonal to the paper conveying direction) as correction values to be used for controlling the post processing position (step S15), and proceeds to step S16.

Figure 12:
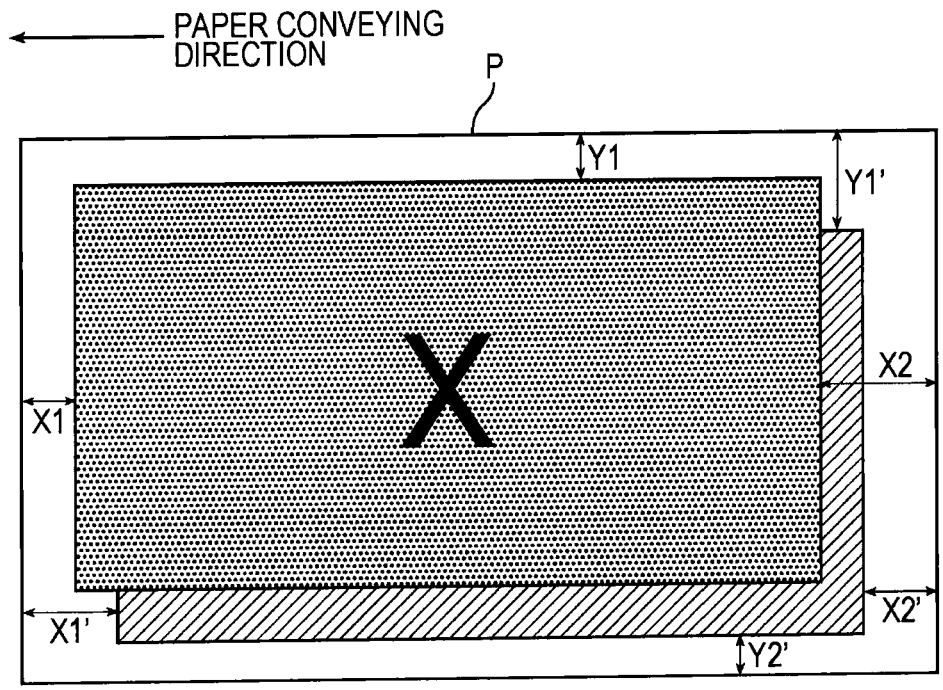
FIG. 12 is a diagram for explaining a method for calculating correction values in a case where images printed on both sides of paper deviate from each other.

For example, using the overall solid image as an example, as illustrated in FIG. 12, in a case of an area in which a position of a front side (bottom side) image of the paper P is filled with dots and an area in which a position of a back side (top side) image is filled with oblique lines, the correction value XH in the paper conveying direction and the correction value YH in the direction orthogonal to the paper conveying direction are respectively $$XH=[\{X1-(X1+X2)/2\}+\{X1'-(X1'+X2')/2\}]/2$$

$$YH=[\{Y1-(Y1+Y2)/2\}+\{Y1'-(Y1'+Y2')/2\}]/2$$

On the other hand, when it is determined that there is the deviation equal to or greater than the second threshold value between the image position of the bottom side and the image position of the top side of the paper P (step S14; YES), the controller 21 ends the post processing position control processing A.

Figure 13:
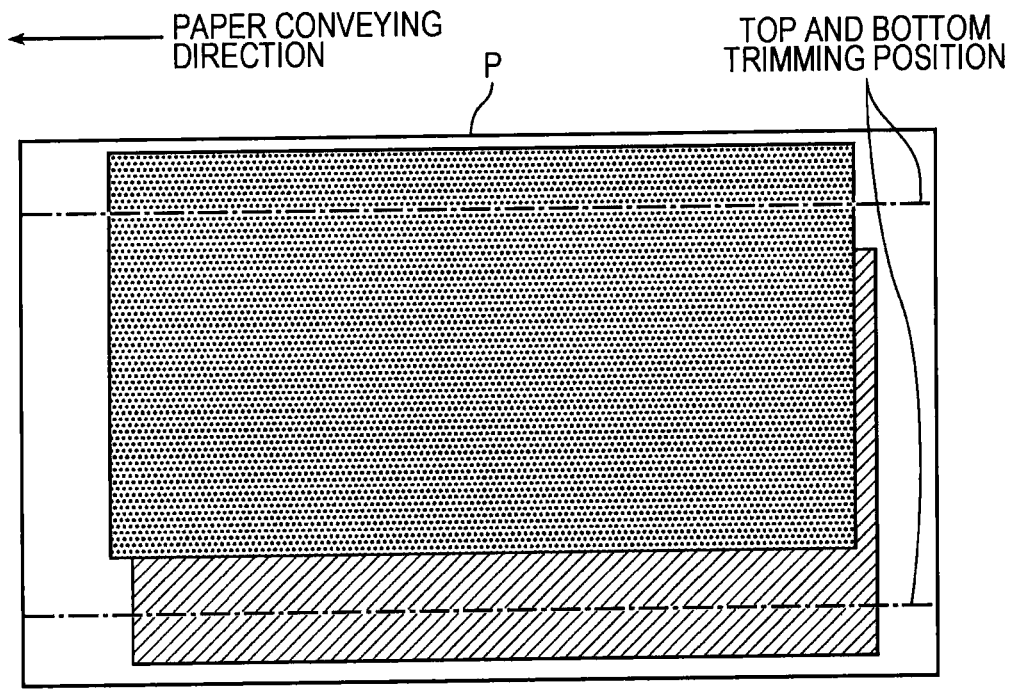
FIG. 13 is a diagram illustrating an example of image arrangement on paper when control is performed such that post processing is not performed.

For example, as illustrated in FIG. 13, in a case where the image position of the bottom side and the image position of the top side of the paper P largely deviate from each other and correction of the post processing position fails (for example, the image is cut off), the controller 21 ends the post processing position control processing A and performs control such that the post processor 23 does not perform post processing. Thus, useless operation can be suppressed.

In step S16, the controller 21 determines whether or not the distance between the paper edge and the image is within a predetermined range (step S16). When it is determined that the distance between the paper edge and the image is not within the predetermined range (step S16; NO), the controller 21 ends the post processing position control processing A.

Figure 14:
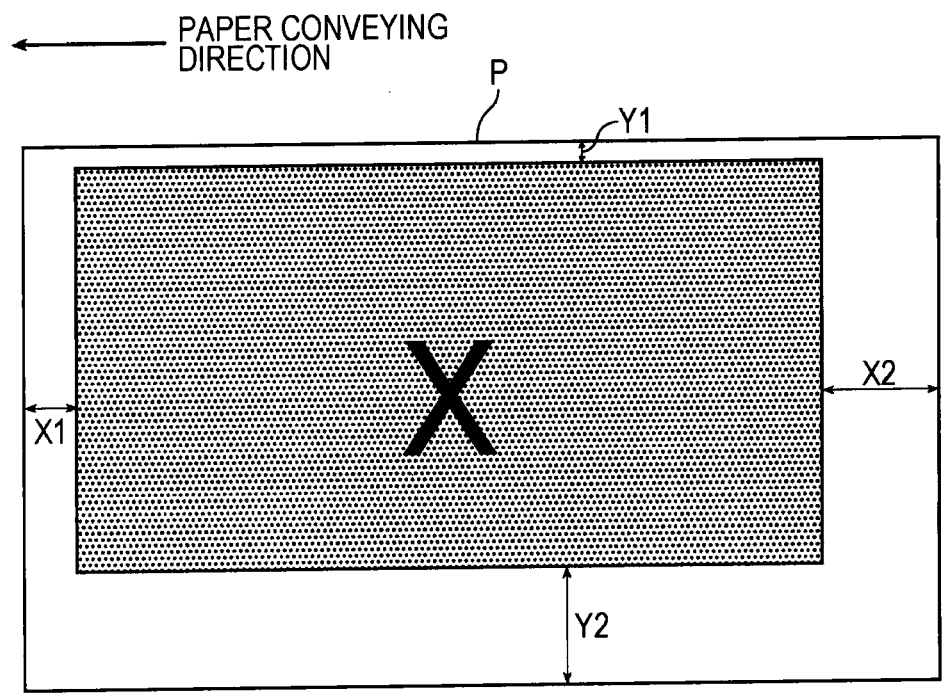
FIG. 14 is a diagram illustrating an example of image arrangement on paper when control is performed such that post processing is not performed.

For example, in a case where the distance between the paper edge and the image is too small and the post processing position is equal to or less than a machine adjustment value prohibition area or a specification value, the post processing position control processing A is ended, and control is performed such that the post processor 23 does not perform post processing. For example, as illustrated in FIG. 14, in a case where a distance Y1 between the paper edge and the image is small and the cut amount after correction exceeds a cut amount specification, post processing is not performed. Thus, useless operation can be suppressed.

When it is determined that the distance between the paper edge and the image edge is within the predetermined range (step S16; YES), the controller 21 controls the post processing position of post processing instructed to be performed in the post processor 23 on the basis of the determined correction values (step S17), and causes the post processor 23 to perform post processing (step S18).

In step S17, among the creasing unit 231, the top and bottom trimming unit 232, the half-folding unit 233, or the punching unit 236, the post processing position of the post processing instructed to be performed is controlled.

For example, in a case where it is instructed to perform creasing processing by the job data, the controller 21 moves the position of the stopper 231*c* such that the distance between the stopper 231*c* and the creasing knife 231*a* is a value obtained by subtracting (or adding) the correction value XH or XH1 from (to) a default value A.

For example, in a case where it is instructed to perform top and bottom trimming processing by the job data, the controller 21 moves the positions of the trimming teeth 232*a*, 232*b* such that respective distances from the paper edges (edges in the paper width direction) to the trimming teeth 232*a*, 232*b* are values obtained by subtracting (or adding) the correction value YH or YH1 from (to) the default values C1, C2.

For example, in a case where it is instructed to perform half-folding processing by the job data, the controller 21 moves the position of the stopper 233*a* such that the distance between the stopper 233*a* and the folding knife 233*c* is a value obtained by subtracting (or adding) the correction value XH or XH1 from (to) the default value A.

For example, in a case where it is instructed to perform punching processing by the job data, the controller 21 moves the position of the punch unit 236*e* such that the distance between the mechanical center of the punch unit 236*e* and the paper edge (edge in the paper width direction) is a value obtained by subtracting the correction value YH or YH1 from (to) a default value B.

Subsequently, the controller 21 determines whether or not processing from step S1 to step S18 has been ended up to the last page (step S19). When it is determined that the processing has not been ended up to the last page (step S19; NO), the controller 21 returns to step S1.

When it is determined that the processing has been ended up to the last page (step S19; YES), the controller 21 determines whether or not to perform saddle stitching processing, edge trimming processing on the basis of the job data (step S20). When it is determined to perform saddle stitching processing, edge trimming processing (step S20; YES), the controller 21 causes the saddle stitching unit 234, the edge trimming unit 235 to perform saddle stitching processing, edge trimming processing, respectively (step S21), and proceeds to step S22. When it is determined not to perform saddle stitching processing, edge trimming processing (step S20; NO), the controller 21 proceeds to step S22.

In step S22, the controller 21 determines whether or not processing for the number of set copies has been ended (step S22). When it is determined that the processing for the number of set copies has not been ended (step S22; NO), the controller 21 returns to step S1.

When it is determined that the processing for the number of set copies has been ended (step S22; YES), the controller 21 ends the post processing position control processing A.

FIGS. 15A and 15B illustrate a creasing position, top and bottom trimming positions, a folding position, and edge trimming positions of paper before trimming, and a finished spread booklet in a case where the above post processing position control processing A is applied. As illustrated in FIGS. 15A and 15B, in the post processing position control processing A, the position of the paper edge and the position of the image are detected from the scan data obtained by reading the paper P on which the image is printed, by the reader 22, and on the basis of the position of the paper edge and the position of the image detected, the post processing position is corrected such that the center of the image area comes to the center of the folding position, the trim position, and the punch position. Therefore, the post processing position can be automatically adjusted without printing an unnecessary mark for positioning, and a high quality booklet can be obtained. In addition, user's burden for post processing position adjustment, wasted sample output, and the like can be omitted.

Second Embodiment

Hereinafter, a second embodiment of the present invention is described.

Figure 16:
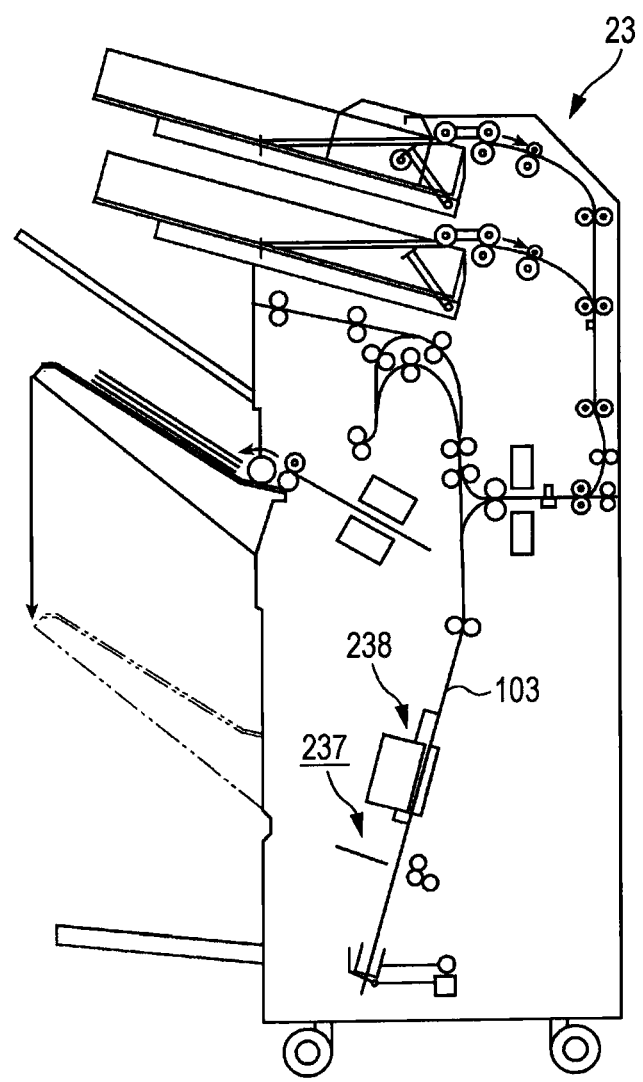
FIG. 16 is a diagram illustrating a schematic configuration example of a post processor in a second embodiment.

In the post processor 23 described as an example in the first embodiment, saddle stitching processing is configured to drive a needle in the half-folding position, and post processing position control according to the present invention is not necessary; however, for example, in a post processor 23 including a half-folding unit 237 and a saddle stitching unit 238 illustrated in FIG. 16, the present invention can be used for controlling the saddle stitching position.

Figure 17:
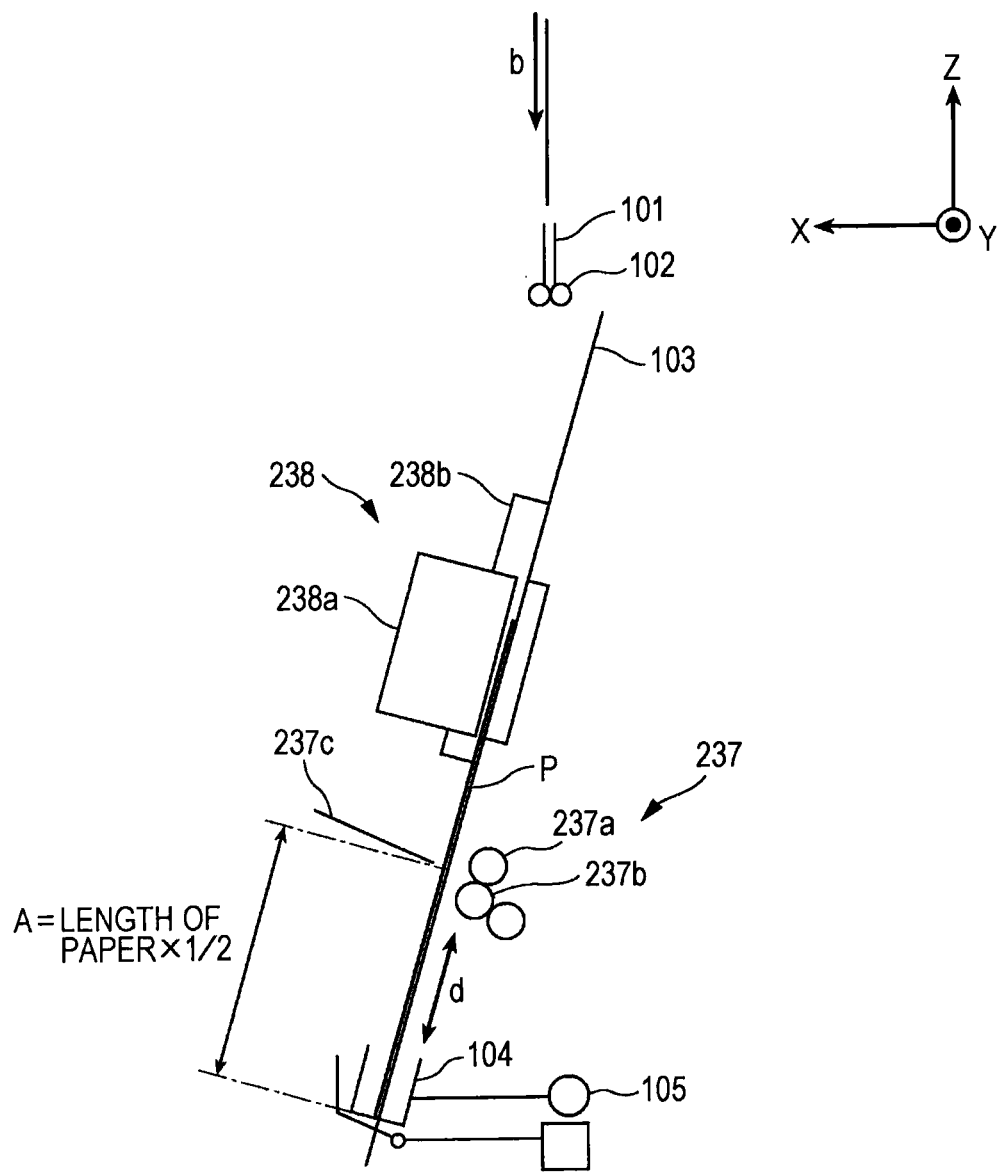
FIG. 17 is an enlarged diagram of a saddle stitching unit and a half-folding unit of the post processor in the second embodiment.

FIG. 17 is a cross-sectional diagram illustrating an example of a basic configuration of the half-folding unit 237 and the saddle stitching unit 238 of the post processor 23 illustrated in FIG. 16, in an XZ plane.

As illustrated in FIG. 17, the half-folding unit 237 and the saddle stitching unit 238 are provided side by side along a stack tray 103, and perform processing to paper P stacked in the stack tray 103.

The stack tray 103 is provided such that its paper conveying direction upstream side is the upper part and its paper conveying direction downstream side is the lower part, and is arranged to be inclined with respect to the vertical direction. Near the entrance of the stack tray 103, a guide 101 and a conveying roller 102 are provided, and the paper P conveyed in a direction of an arrow b is discharged to the stack tray 103 via the guide 101 and the conveying roller 102. In the lower part of the stack tray 103, a stopper 104 is provided, and the paper P conveyed stops in a state of being restricted to a predetermined position by the stopper 104. In a case where half-folding processing is performed, a folding knife 237c extends between folding rollers 237a, 237b in this state, whereby the paper is sandwiched between the folding rollers, and a fold is formed. Here, a position of the stopper 104 can be moved in a direction of an arrow d along the stack tray 103 by a driving source 105, and is positioned such that a distance between the stopper 104 and the folding knife 237c is A=the length of the paper P in the conveying direction×½, in default, during half-folding processing.

Incidentally, in a case where saddle stitching processing is performed, after the paper P for the number of set sheets is stacked by the stopper 104, the stopper 104 is moved to a position corresponding to saddle stitching processing by the driving source 105, and after saddle stitching processing by a stapler 238a is ended, the stopper 104 is moved to a position corresponding to half-folding processing. During saddle stitching processing, the position of the stopper 104 is positioned such that a distance between the stopper 104 and the center of a binding position of the stapler 238a is A=the length of the paper P in the conveying direction×½, in default.

Since other elements of the post processing apparatus 2 are the same as those described in the first embodiment, the description thereof is referenced.

Next, operation of the post processing apparatus 2 in the second embodiment is described.

Figure 18:
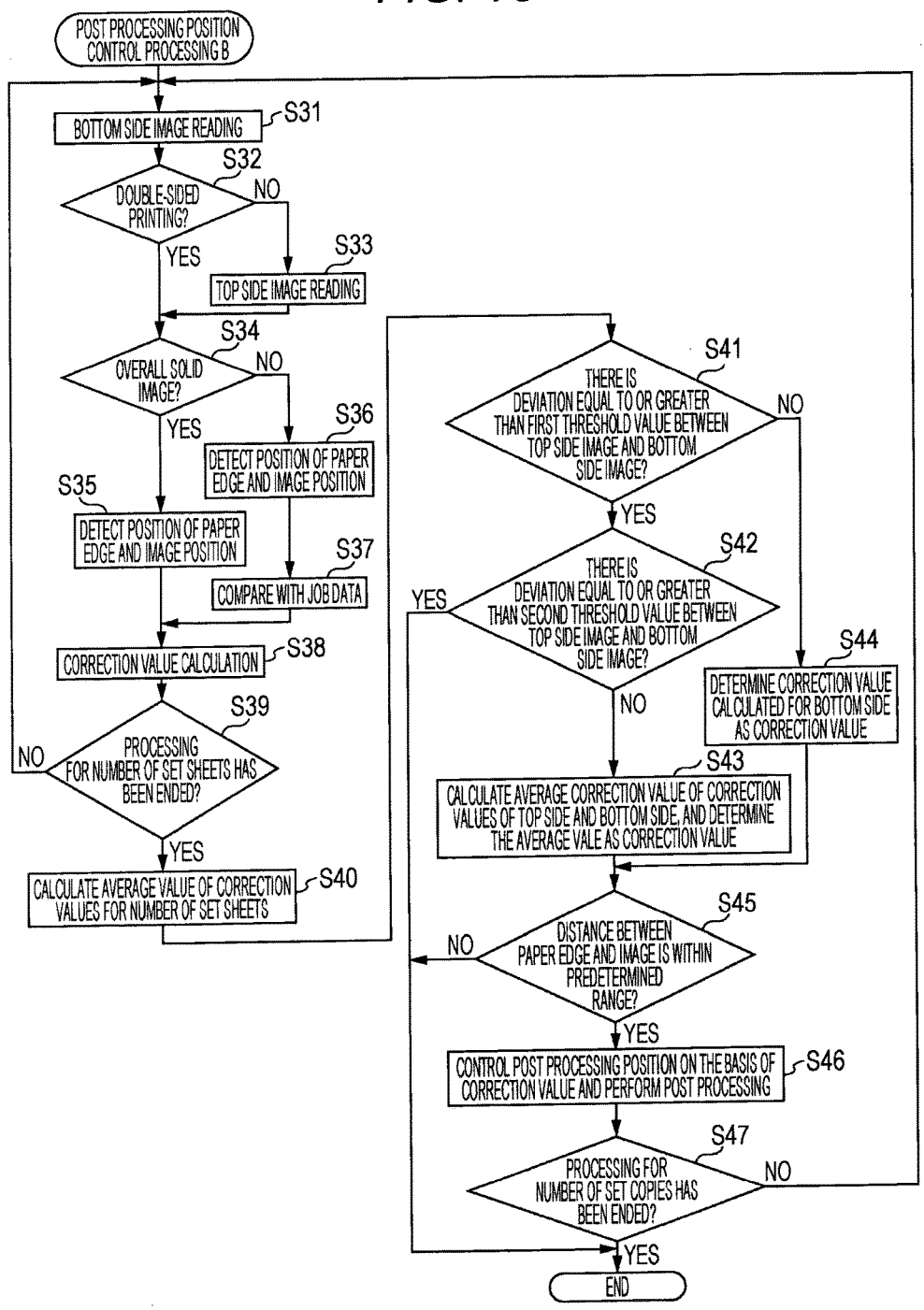
FIG. 18 is a flowchart illustrating post processing position control processing B executed by the controller of FIG. 2 in the second embodiment.

FIG. 18 illustrates a flowchart of post processing position control processing B executed by the controller 21 in the second embodiment. The post processing position control processing B is executed by cooperation between the CPU of the controller 21 and the programs stored in the ROM when the job data is received from the image forming apparatus 1 by the communication unit 25 and the paper P on which the image has been formed is conveyed.

First, the controller 21 executes processing from step S31 to step S38, and calculates correction values for controlling the post processing position. Since the processing from step S31 to step S38 is the same as the processing from step S1 to step S8 described in the first embodiment, the description thereof is referenced.

In step S39, the controller 21 determines whether or not calculation of the correction values for the number of set sheets (one copy) has been ended (step S39). When it is determined that the calculation of the correction values for the number of set sheets has not been ended (step S39; NO), the controller 21 returns to step S31.

When it is determined that the calculation of the correction values for the number of set sheets has been ended (step S39; YES), the controller 21 calculates average values of the correction values for the number of set sheets (step S40).

Subsequently, the controller 21 executes processing from step S41 to step S45. That is, in a case of double-sided printing, the final correction values are determined on the basis of an amount of deviation between the correction values of the top side and the bottom side. Then, the controller 21 controls the post processing position and causes the post processor 23 to execute post processing on the basis of the determined correction values (step S46). Incidentally, since the processing from step S41 to step S45 is the same as the processing from step S12 to S16 described in the first embodiment, the description thereof is referenced.

For example, in a case where half-folding processing is performed, the controller 21 moves the position of the stopper 104 such that the distance between the stopper 104 and the folding knife 237c is a value obtained by subtracting (or adding) the correction value XH or XH1 from (to) a default value A.

In addition, for example, in a case where half-folding processing is performed, the controller 21 moves the position of the stopper 104 such that a distance between the stopper 104 and the center of a binding position of a stapler 238c is a value obtained by subtracting (or adding) the correction value XH or XH1 from (to) the default value A.

Subsequently, the controller 21 determines whether or not processing for the number of set copies has been ended (step S47). When it is determined that the processing for the number of set copies has not been ended (step S47; NO), the controller 21 returns to step S31.

When it is determined that the processing for the number of set copies has been ended (step S47; YES), the controller 21 ends the post processing position control processing B.

In this way, the present invention can also be applied to saddle stitching processing, and the center of the image area on the paper P can be made to be the center of the saddle stitching position.

As described above, according to the post processing apparatus 2, the controller 21 detects the position of the edge of the paper P and the position of the image on the paper P from the read image acquired by the reader 22, and controls the post processing position in the post processor 23 on the basis of the position of the edge of the paper P and the position of the image detected. Therefore, the post processing position can be controlled without printing an unnecessary mark.

For example, the controller 21 can control the creasing position, the half-folding position, or the saddle stitching position in the post processor 23 on the basis of the position of the edge in the paper conveying direction of the paper P and the position in the paper conveying direction of the image on the paper P.

In addition, for example, the controller 21 can control the top and bottom trimming position or the punch position in the post processor 23 on the basis of the position of the edge in the direction orthogonal to the paper conveying direction of the paper P and the position in the direction orthogonal to the paper conveying direction of the image on the paper P.

In addition, in a case where the images are formed on both sides of the paper P, the reader 22 reads both sides of the paper P to acquire read images of both sides of the paper P, and the controller 21 controls the post processing position in the post processor 23 on the basis of the read images of both sides of the paper P acquired by the reader 22. Therefore, also in double-sided printing in which images are formed on both sides, the post processing position can be controlled without printing the unnecessary mark.

In addition, in a case where positions of the images formed on both sides of the paper P deviate from each other by equal to or greater than a first threshold value, the controller 21 controls the post processing position to a position different from the post processing position in a case where the image is formed on only one side of the paper P. Therefore, the post processing position can be controlled in accordance with a deviation between the images of both sides.

In addition, in a case where the positions of the images formed on both sides of the paper P deviate from each other by equal to or greater than a predetermined second threshold value (second threshold value>first threshold value), the controller 21 performs control such that the post processor 23 does not perform post processing. Therefore, in a case where the image position of the bottom side and the image position of the top side of the paper P largely deviate from each other and correction of the post processing position fails (for example, the image is cut off), the post processing is not performed, so that useless operation of the post processor 23 can be suppressed.

In addition, in a case where a distance between the edge of the paper P and the image is outside a predetermined range, the controller 21 performs control such that the post processor 23 does not perform post processing. Therefore, for example, in a case where the distance between the paper edge and the image is too small and the post processing position is equal to or greater than a machine adjustment value prohibition area or a specification value, post processing is not performed, so that useless operation of the post processor 23 can be suppressed.

In addition, in a case where the image is not an overall solid image, the controller 21 controls the post processing position in the post processor 23 on the basis of the position of the edge of the paper and the position of the image on the paper P detected from the read image acquired by the reader 22, and the job data of when the image is formed on the paper. Therefore, even in a case where the image is not the overall solid image and the position of the image edge cannot be detected from the scan data, the post processing position can be controlled without printing the unnecessary mark.

In addition, the controller 21 controls the post processing position for the paper P in the post processor 23 on the basis of the read image of one sheet of the paper P acquired by the reader 22, thereby being capable of controlling the post processing position accurately for each one sheet of the paper on which the image is formed in the image forming apparatus 1.

In addition, the controller 21 controls the post processing position in the post processor 23 on the basis of read images of a plurality of sheets of paper acquired by the reader 22, thereby being capable of controlling the post processing position even in a case where controlling the post processing position for each one sheet of the paper P cannot be made in time.

Incidentally, the descriptions in the above embodiments show suitable examples of the post processing apparatus according to the present invention, and the post processing apparatus is not limited thereto.

For example, in the above embodiments, the post processing apparatus has been described as an example, the apparatus being configured to perform creasing processing, top and bottom trimming processing, half-folding processing, saddle stitching processing, and punch processing, as post processing; however, not limited thereto, it may be the post processing apparatus capable of some of the above post processing, and may be the post processing apparatus including another post processing function. In addition, the configuration of the post processor and the technique for calculating the correction values of the post processing position are each an example, and are not limited thereto.

In addition, in the image forming system in which the controller of the image forming apparatus controls the post processing apparatus, the above-described post processing position control processing A or B may be executed by the controller of the image forming apparatus, and on the basis of the read image acquired by the reader, the position of the edge of the paper and the position of the image may be detected from the read image in the controller of the image forming apparatus, and the post processing position may be controlled on the basis of the position of the paper edge and the position of the image detected.

In addition, in the above descriptions, an example has been disclosed in which the ROM, nonvolatile memory, hard disk, or the like is used as a computer readable medium for programs according to the present invention, but the medium is not limited thereto. As another computer readable medium, a portable recording medium such as CD-ROM can be applied. In addition, as a medium for providing data of the programs according to the present invention via a communication line, a carrier wave is also applied.

Besides, the detailed configuration and detailed operation of the post processing apparatus can also be modified if appropriate within a range without departing from the spirit of the present invention.

Although embodiments of the present invention have been described and illustrated in detail, it is clearly understood that the same is by way of illustration and example only and not limitation, the scope of the present invention should be interpreted by terms of the appended claims.

What is claimed is:

1. A post processing apparatus comprising:
   a reader that reads paper on which an image is formed by an image forming apparatus, the reader configured to output a read image of the paper;
   a post processor configured to perform post processing on the paper; and
   a hardware processor that detects a position of an edge of the paper and a position of the image from the read image outputted by the reader, and controls a post processing position in the post processor on the basis of the position of the edge of the paper and the position of the image detected,
   wherein the reader, when images are formed on both sides of the paper, reads both sides of the paper to output read images of a front side image and a back side image present on respective sides of the paper, and
   the hardware processor controls the post processing position in the post processor on the based on a position of the front side image and a position of the back side image on the paper indicated by the read images outputted by the reader; and
   the hardware processor, when a distance between the edge of the paper and the image is outside a predetermined range, performs control such that the post processor does not perform post processing.

2. The post processing apparatus according to claim 1, wherein
   the post processor performs at least one of creasing processing, top and bottom trimming processing, half-folding processing, saddle stitching processing, or punch processing, to the paper.

3. The post processing apparatus according to claim 2, wherein
   the hardware processor performs control of a creasing position, a half-folding position, or a saddle stitching position in the post processor on the basis of a position of an edge in a paper conveying direction of the paper and a position in the paper conveying direction of the image.

4. The post processing apparatus according to claim 2, wherein
   the hardware processor performs control of a top and bottom trimming position or a punch position in the post processor on the basis of a position of an edge in a direction orthogonal to a paper conveying direction of the paper and a position in a direction orthogonal to the paper conveying direction of the image.

5. The post processing apparatus according to claim 1, wherein
   the hardware processor, on the basis of a read image of one sheet of paper outputted by the reader, controls a post processing position to the paper in the post processor.

6. The post processing apparatus according to claim 1, wherein
   the hardware processor, on the basis of read images of a plurality of sheets of paper outputted by the reader, controls the post processing position in the post processor.

7. The post processing apparatus according to claim 1, wherein the paper is of a paper size, and the reader has a reading range that is wider than the paper size.

8. The post processing apparatus according to claim 1, wherein the read image outputted by the reader encompasses the paper entirely.

9. The post processing apparatus according to claim 1, wherein the image is formed on the paper according to job data that defines a specified location of the image on the paper, the image is formed at an actual location on the paper, and the hardware processor controls the post processing position according to a correction value determined by the hardware processor from the specified location and the actual location.

10. A post processing apparatus comprising:
    a reader that reads paper on which an image is formed by an image forming apparatus, the reader configured to output a read image of the paper;
    a post processor configured to perform post processing on the paper; and
    a hardware processor that detects a position of an edge of the paper and a position of the image from the read image outputted by the reader, and controls a post processing position in the post processor on the basis of the position of the edge of the paper and the position of the image detected,
    wherein the reader, when images are formed on both sides of the paper, reads both sides of the paper to output read images of a front side image and a back side image present on respective sides of the paper;
    the hardware processor controls the post processing position in the post processor on the based on a position of the front side image and a position of the back side image on the paper indicated by the read images outputted by the reader; and
    the hardware processor, when the position of the front side image and the position of the back side image formed on the paper deviate from each other by equal to or greater than a first threshold value, controls the post processing position to a position different from a post processing position of when an image is formed only on one side of the paper.

11. The post processing apparatus according to claim 10, wherein
    the hardware processor, when the position of the front side image and the position of the back side image formed on the paper deviate from each other by equal to or greater than a predetermined second threshold value, performs control such that the post processor does not perform post processing, and wherein the second threshold value is greater than the first threshold value.

* * * * *